C. L. POND.
Terrets for Harness.

No. 200,476. Patented Feb. 19, 1878.

Witnesses,
Amos W. Sangster,
Wm. S. Grosvenor

Inventor,
Charles L. Pond.
By James Sangster
Atty.

UNITED STATES PATENT OFFICE.

CHARLES L. POND, OF BUFFALO, NEW YORK.

IMPROVEMENT IN TERRETS FOR HARNESS.

Specification forming part of Letters Patent No. 200,476, dated February 19, 1878; application filed November 3, 1877.

*To all whom it may concern:*

Be it known that I, CHARLES L. POND, of the city of Buffalo, in the county of Erie and State of New York, have invented certain new and useful Improvements in Terrets, which improvements are fully set forth in the following specification and accompanying drawing, in which—

Figure 1:
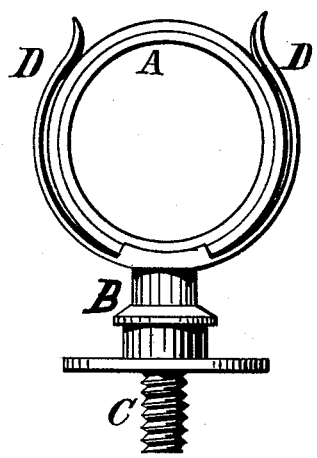
Figure 2:
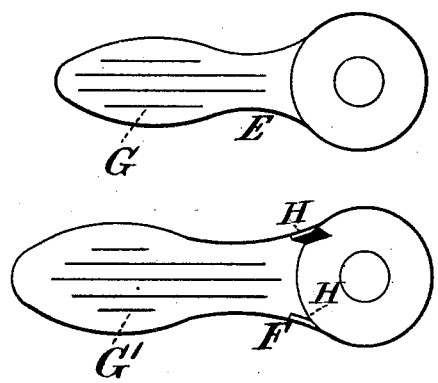
Figure 3:
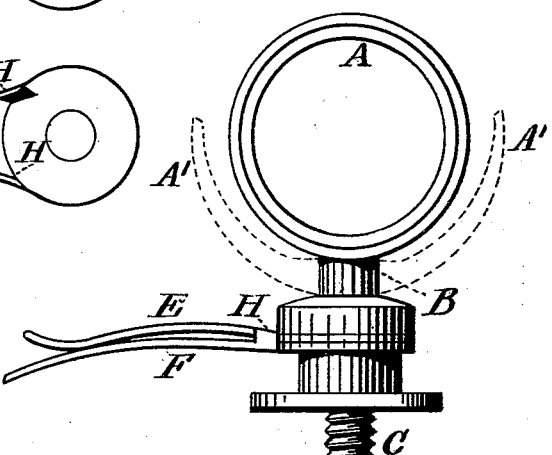

Figure 1 is a side elevation of the invention complete, and Figs. 2 and 3 are modifications of the same.

My invention consists of a terret in combination with a spring device for readily fastening or releasing the halter or leader strap, as will more clearly appear by reference to said drawing, in which—

A is the terret-ring; B, the body of the terret, and C the screw-shank by which it is fastened to the saddle of the harness. D represents the spring attachment, which is fastened to the ring by a nut on the screw C; or it may be made of two pieces, and fastened to the lower part of the ring with screws; but I prefer the arrangement shown in Fig. 1, where the two springs D are formed of one piece, having a hole at the lower part, so it can be slipped onto the screw C and fastened, as before mentioned.

In Figs. 2 and 3 I have shown a modification of my invention in which the spring device is fastened on to the terret in the same way; but the springs are arranged so as to project out to one side, instead of clasping partly around the ring, as shown in Fig. 1.

The two parts of the spring are shown separate in Fig. 2 at E F, and are corrugated at G G', where they spring together, so as to hold the strap more firmly when placed between them.

The inner sides of the springs D in Fig. 1 may also be made rough in some similar way for the same purpose.

In Figs. 2 and 3, H represents two small projections from the lower spring for the purpose of preventing one from turning past the other, or keeping them both in the same line. One of the springs D may be taken or left off from the ring A, and still leave a ready means for fastening or releasing the strap; and, if desired, a guard may be arranged on each side of the ring A, as shown by the dotted lines A' in Fig. 3, to stop the springs D from being accidentally drawn out too far, or beyond the point of elasticity.

I claim as my invention—

The terret A B C, in combination with one or more encircling springs, D, arranged substantially as shown, for the purpose set forth.

CHARLES L. POND.

Witnesses:
 AMOS W. SANGSTER,
 WM. S. GROSVENOR.